US008243662B2

(12) United States Patent
Zheng

(10) Patent No.: US 8,243,662 B2
(45) Date of Patent: Aug. 14, 2012

(54) METHOD, SYSTEM AND APPARATUS FOR IMPLEMENTING BANDWIDTH ALLOCATION BASED ON A RELAY STATION

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1174 days.

(21) Appl. No.: 12/058,486

(22) Filed: Mar. 28, 2008

(65) Prior Publication Data

US 2008/0259857 A1  Oct. 23, 2008

Related U.S. Application Data

(63) Continuation of application No. PCT/CN2006/002599, filed on Sep. 30, 2006.

(30) Foreign Application Priority Data

Sep. 30, 2005  (CN) .......................... 2005 1 0107411

(51) Int. Cl.
*H04W 4/00* (2009.01)
(52) U.S. Cl. ....................................... 370/329
(58) Field of Classification Search .................. 375/211
See application file for complete search history.

(56) References Cited

U.S. PATENT DOCUMENTS

| 6,889,047 | B2 | 5/2005 | Ishida |
| 7,095,722 | B1 | 8/2006 | Walke et al. |
| 2004/0218604 | A1 | 11/2004 | Porter |

(Continued)

FOREIGN PATENT DOCUMENTS

CN         1309511 A    8/2001

(Continued)

OTHER PUBLICATIONS

Kaneko, Proposed Relay Method with P-MP Structure of IEEE 802.16-2004, 2005, IEEE 16th International Symposium on Personal, Indoor and Mobile Radio communications, pp. 1606-1610.*

(Continued)

*Primary Examiner* — Chi Pham
*Assistant Examiner* — Kouroush Mohebbi
(74) *Attorney, Agent, or Firm* — Leydig, Voit & Mayer, Ltd.

(57) ABSTRACT

The present invention relates to a method, a system and an apparatus for implementing bandwidth allocation and scheduling management based on a relay station. A mapping information unit for controlling a RS ($MAP_{RS}$) is set in a frame structure of the physical layer of a BS and an extended frame structure of the physical layer of a BS is constructed in a frame structure of the BS physical layer. The BS constructs a mapping information message $MAP_{RS}$ for controlling the relay station RS base on the extended frame structure of the BS physical layer, and performs bandwidth allocation and scheduling management of a communication channel of the RS by the RS according to the $MAP_{RS}$ message. Through the present invention, a bandwidth allocation is implemented mainly at the BS, and a service scheduling is implemented mainly at the BS. The RS only performs an uplink or downlink scheduling of the RS passively. The complexity of the RS reduced effectively. The Multi-hop relay problem is solved using a bandwidth request relay and a bandwidth allocation relay, without introducing any complex technologies and procedures of the bandwidth request, the bandwidth allocation and the scheduling management. The complexity of the BWA relay network is simplified.

11 Claims, 7 Drawing Sheets

U.S. PATENT DOCUMENTS

| | | | |
|---|---|---|---|
| 2005/0030931 A1* | 2/2005 | Sung et al. | 370/342 |
| 2006/0120321 A1 | 6/2006 | Gerkis et al. | |
| 2006/0193286 A1* | 8/2006 | Naghian et al. | 370/328 |
| 2007/0072604 A1* | 3/2007 | Wang | 455/428 |
| 2008/0316954 A1* | 12/2008 | Zheng | 370/315 |
| 2009/0219853 A1* | 9/2009 | Hart et al. | 370/315 |

FOREIGN PATENT DOCUMENTS

| | | | |
|---|---|---|---|
| CN | 1430428 A | 7/2003 | |
| CN | 1524395 A | 8/2004 | |
| CN | 1193552 C | 3/2005 | |
| WO | WO 03/058984 A2 | 7/2003 | |
| WO | WO 03058984 A2 * | 7/2003 | 370/329 |
| WO | WO 2004/006603 A2 | 1/2004 | |
| WO | WO 2005/064872 A1 | 7/2005 | |
| WO | WO 2005/067173 A1 | 7/2005 | |
| WO | WO 2006079932 A2 * | 8/2006 | |
| WO | WO 2006079932 A3 * | 8/2006 | |

OTHER PUBLICATIONS

State Intellectual Property Office of the People's Republic of China, Examination Report in Chinese Patent Application No. 2005101074111 (Feb. 12, 2010).

European Patent Office, Extended European Search Report in European Patent Application No. 06791185.9 (Mar. 31, 2010).

State Intellectual Property Office of the People's Republic of China, International Preliminary Report on Patentability (Apr. 1, 2008) and English Translation of Written Opinion of the International Searching Authority (Feb. 8, 2008) in International Patent Application No. PCT/CN2006/002599.

IEEE Standards, "Part 16: Air Interface for Fixed Broadband Wireless Access Systems," IEEE Computer Society and the IEEE Microwave Theory and Techniques Society, Sponsored by the LAN/MAN Standards Committee, IEEE Std 802.16™-2004, Revision of IEEE Std 802.16-2001 (Oct. 1, 2004).

Ren, "A Recommendation on PMP Mode Compatible Frame Structure," IEEE 802.16 Presentation Submission Template (Rev. 8.3), Document No. IEEE C802.16mmr-05/005r2 (Sep. 9, 2005).

Kaneko et al., "Proposed Relay Method with P-MP Structure of IEEE 802.16-2004," IEEE 16th International Symposium on Personal, Indoor and Mobile Radio Communications, pp. 1606-1610 (2005).

Hsu, "Mobility Management for Mobile Multi-hop Relay Networks," IEEE 802.16 Presentation Submission Template (Rev. 8.3), Document No. IEEE C80216mmr-05_003, XP-002419887 (Sep. 9, 2005).

* cited by examiner

METHOD, SYSTEM AND APPARATUS FOR IMPLEMENTING BANDWIDTH ALLOCATION BASED ON A RELAY STATION

CROSS-REFERENCE TO RELATED APPLICATIONS

This application is a continuation of International Patent Application No. PCT/CN2006/002599, filed Sep. 30, 2006, which claims priority from the Chinese Patent Application No. 200510107411.1, submitted with the State Intellectual Property Office of P.R.C. on Sep. 30, 2005, entitled "Method, System and Apparatus for Implementing Bandwidth Allocation and Scheduling Management based on a Relay Station", commonly assigned, both are incorporated by reference herein for all purposes.

FIELD OF THE INVENTION

The present invention relates to the field of communication, and more particularly to a method, a system and an apparatus for implementing bandwidth allocation based on a relay station.

BACKGROUND OF THE INVENTION

Currently, a layered model of a broadband wireless access is illustrated in FIG. 1. The layered model in FIG. 1 includes a physical layer (PHY) and a data link layer (MAC). The data link layer is divided into a service specific convergence sublayer (SSCS or CS), a MAC common part sublayer (MAC CPS) and a security sublayer (SS).

Bandwidth allocation and a scheduling management are implemented at the MAC CPS layer. One of the important characteristics of the broadband wireless access is that it supports various kinds of services. The services are categorized into four categories according to the service data characteristics of the services, and four kinds of service scheduling styles are provided correspondingly as follows:

1. Unsolicited Grant, the service corresponding to the Unsolicited Grant is a Unsolicited Grant Service (UGS).
2. Real-time Polling, corresponding to a Real-time Polling Service (RtPS).
3. Non-real-time Polling, corresponding to a Non-real-time Polling Service (NrtPS).
4. Best Effort, corresponding to a Best Effort Service (BE).

Except the Unsolicited Grant Service, the uplink bandwidth allocations of the other services have to undergo the procedure of the bandwidth request/allocation. The difference of service scheduling categories is mainly embodied in the difference of the sending mode of the bandwidth request.

The service scheduling is that the MAC layer controls the data transmission on the connection according to a different QoS requirement of the service flow corresponding to each connection. Each connection corresponds to one group of the QoS Parameters. The corresponding relationship is shown in Table 1. The QoS Parameters may be managed by the interaction of the flow management messages in the MAC layer, such as DSA, DSC, DSD and DSX-RVD.

TABLE 1

|  | UGS | rtPS | nrtPS | BE |
| --- | --- | --- | --- | --- |
| Maximum sustained service data ratio | √ | √ | √ | √ |
| Minimum reserved service data ratio |  | √ | √ |  |
| Maximum delay | √ | √ |  |  |
| Tolerable dithering | √ |  |  |  |
| Requesting sending strategy | √ | √ | √ | √ |
| Service priority |  |  | √ | √ |

For the uplink, a collision may be happened due to supporting multipoint-to-point data sending by the broadband wireless access. For example, several SS/MSSs (subscriber station/mobile subscriber station) send data to BS (base station). Particularly when sending a long data, the collision ratio is high. In order to avoid overmuch collision, the basic mechanism of the uplink channel sending opportunity of the BS is as follows.

The first step: a SS/MSS sends a bandwidth request (BW Request) for the connection to request resource;

The second step: a BS performs an uplink bandwidth allocation according to the bandwidth request, and indicates the usage and the location of each burst for the corresponding connection in an uplink mapping message (UL-MAP);

The third step: the SS/MSS sends the message at the appointed location of the burst on the corresponding connection.

For downlinks, the broadband wireless access supports point-to-multipoint data sending. For example, the BS sends data to several SS/MSSs. In order to distinguish each subscriber in the time-frequency space, the basic mechanism of the downlink channel sending of the BS is as follows.

The first step: the BS performs a downlink scheduling, and indicates the usage and the location of each burst of the corresponding connection in the DL-MAP message.

The second step: a SS/MSS receives the message at the appointed location of the burst on the corresponding connections.

The so-called bandwidth allocation is the procedure that the BS provides the uplink sending opportunity or the opportunity for requesting bandwidth to the subordinate SS/MSS. The procedure is specifically as follows.

After determining the scheduling service categories and the corresponding QoS parameters, the scheduler of the BS may get the throughput and delay requirement of the uplink service, and allocate the sending opportunity or the opportunity for requesting bandwidth at a proper time. The procedure that the BS provides the opportunity for sending bandwidth request to the SS/MSS is called Polling.

Currently, the format of the data transmitting on the physical channel of the broadband wireless access is a frame format. Every frame includes a downlink subframe (DL subframe) and an uplink subframe (UL subframe).

If a TDD (Time Division Duplex) mode is adopted, the downlink subframe is transmitted first, and then the uplink subframe is transmitted subsequently. The OFDM (or SC (Single Carrier)) frame structure of the TDD mode is shown in FIG. 2.

If a FDD (Frequency Division Duplex) mode is adopted, the uplink subframe and the downlink subframe are transmitted simultaneously, and the uplink subframe and the downlink subframe are sent in different frequencies. The downlink subframe is not sent at the same time when the uplink subframe is sent corresponding to the SS of a half duplex FDD mode. The OFDM (or SC) frame structure of the FDD mode is shown in FIG. 3.

No matter the TDD mode or the FDD mode is adopted, one downlink subframe has only one downlink physical layer protocol data unit (DL PHY PDU), and one uplink subframe includes timeslots as following order: a contention slot for initial ranging, a contention slot for bandwidth (BW) requests and one or more uplink physical layer protocol data units (UL PHY PDU). Every UL PHY PDU comes from different subscriber stations (SS).

The downlink PHY PDU start with a preamble which is used for synchronization; and the preamble is followed by FCH (frame control head) burst. The FCH includes a DownLink_Frame_Prefix (DLFP) for appointing the usage and length of one or more downlink bursts closely-following the FCH. A DL-MAP (downlink mapping) message is the first MAC PDU closely-following the FCH if the DL-MAP is sent at the current frame. The UL-MAP closely follows behind the DL-MAP or the DLFP if there is a DL-MAP being sent. They may closely follow behind the DL-MAP and the UL-MAP if the DCD (downlink channel descriptor) message and the UCD (uplink channel descriptor) message are sent in the frames. The DL-MAP message, UL-MAP message, DCD message and UCD message are sent at the location of DL-Burst #1 (the No. 1 downlink burst). The usages and the locations of the other bursts of the downlink subframe are appointed by the DL-MAP, and the usage and location of each burst of the uplink subframe are appointed by the UL-MAP. In the TDD system, a TTG and a RTG may be inserted at the alternation time of the uplink subframe and the downlink subframe for leaving a period time for the BS to complete the alternation of receiving and sending.

In the OFDMA frame structure of the TDD mode shown in FIG. 4, the downlink subframe is transmitted first, and then the uplink subframe is transmitted.

In the OFDMA (or SOFDMA) frame structure of the FDD mode, the uplink subframe and the downlink subframe are sent in different frequencies.

No matter in the frame structure of OFDMA of the TDD mode or of the FDD mode, all the effective subcarriers are categorized into several subcarrier sets, and every subcarrier set is called a subchannel. The PHY burst in the OFDMA is formed by a group of adjacent subchannels and a group of OFDMA symbols. One burst may be allocated to one subscriber (SS) (or a group of subscribers) in the uplink, and may be sent to the SS as a sending unit by the BS in the downlink. An initial access, a periodicity ranging and a bandwidth request of the uplink SS may be performed via a ranging subchannel.

Currently, the broadband wireless access has already proposed a concept of the WiMAX Relay Station (RS). One of the important actions of the RS is to be used as a relay between the BS and the SS/MSS. However, in the system having been set with the relay station, there isn't any scheme for bandwidth allocation and scheduling management of the SS/MSS currently.

SUMMARY OF THE INVENTION

The object of the present invention is to provide a method, system and apparatus for implementing bandwidth allocation and scheduling management based on a relay station, in order to decrease the complexity of the RS and simplify the complexity of the BWA (Broadband Wireless Access) relay network.

The object of the present invention is implemented by the following technical solutions.

The present invention provides a method for implementing bandwidth allocation and scheduling management based on a relay station, including:

constructing, by a base station (BS), a bandwidth grant information of a mapping information unit (MAPRS) for controlling a relay station (RS), based on an extended frame structure of the BS physical layer; sending the bandwidth grant information to the RS; and performing, by the RS bandwidth allocation and scheduling management for a communication channel of the RS according to the bandwidth grant information received;

wherein the extended frame structure of the BS physical layer is the frame structure of the BS physical layer set with the MAPRS for controlling the RS; and the mapping information unit is an uplink mapping information unit (UL-MAPRS) and/or a downlink mapping information unit (DL-MAPRS).

The technical solutions of the following methods may be optional technical solutions.

The frame structure of the BS physical layer further includes a downlink mapping information unit (DL-MAPBS) for controlling the BS and an uplink mapping information unit (UL-MAPBS) for controlling the BS, or in the event that the frame structure of the BS physical layer includes a downlink mapping information unit (DL-MAPBS) for controlling the BS and an uplink mapping information unit (UL-MAPBS) for controlling the BS, the frame structure of the BS physical layer further comprises a downlink channel descriptor (DCD) and/or an uplink channel descriptor (UCD).

The method specifically includes:

gaining, by a subscriber station/mobile subscriber station (SS/MSS), a sending timeslot or a time frequency block for sending a bandwidth request message, and sending the bandwidth request message;

performing, by the RS, a relay processing to the bandwidth request message initiated by the SS/MSS, and transmitting the bandwidth request message to the BS;

performing, by the BS, bandwidth allocation and scheduling management according to the bandwidth request message, constructing the bandwidth grant information based on the extended frame structure of the BS physical layer, and sending the bandwidth grant information to the RS;

performing, by the RS, bandwidth allocation according to the bandwidth grant information of the BS, and transmitting a processing result to the corresponding SS/MSS; and selecting, by the SS/MSS, a corresponding connection and a location on the connection according to the information received, and interacting information with the BS at the location via the connection.

Alternatively, the method specifically includes:

allocating, by the BS, an uplink bandwidth of the RS positively, and notifying the RS via the bandwidth grant message of the UL-MAPRS;

performing, by the RS, an uplink scheduling of the RS passively according to the bandwidth grant message of the UL-MAPRS sent by the BS, performing the downlink scheduling of the RS positively, and generating the bandwidth grant message of the DL-MAPRS positively; and performing, by the RS, a relay processing to the bandwidth grant message of the UL-MAPRS, and sending the bandwidth grant message of the UL-MAPRS after the relay processing and the bandwidth grant message of the DL-MAPRS generated positively to an SS/MSS of the RS.

The procedure of transmitting the bandwidth request message to the BS includes:

initiating, by the SS/MSS, the bandwidth request via using a request information element (Request IE) of broadcast, multicast or unicast which are appointed in the bandwidth grant message of the UL-MAPRS of the BS relayed by the RS; and performing, by the RS, the relay processing to the received bandwidth request message, and sending the bandwidth request message to the BS.

The procedure of performing, by the BS, bandwidth allocation and scheduling management, and constructing the bandwidth grant information for sending includes:

performing, by the BS, bandwidth allocation to the uplink bandwidth and downlink bandwidth of the BS and the uplink bandwidth of the RS respectively according to the bandwidth request message, constructing the bandwidth grant message of the DL-MAPBS, UL-MAPBS and UL-MAPRS based on the extended frame structure of the BS physical layer, and sending the bandwidth grant message to the RS; or performing, by the BS, bandwidth allocation and scheduling management to the uplink bandwidth and downlink bandwidth of the BS and the uplink bandwidth and downlink bandwidth of the RS respectively according to the bandwidth request message, constructing the bandwidth grant message of the DL-MAPBS, UL-MAPBS, DL-MAPRS and UL-MAPRS based on the extended frame structure of the BS physical layer, and sending the bandwidth grant message to the RS.

The procedure of performing, by the RS, bandwidth allocation and schedule processing, and transmitting a processing result to the corresponding SS/MSS comprises:

performing, by the RS, an uplink scheduling to the RS bandwidth passively according to the bandwidth grant message of the UL-MAPRS of the BS, performing a downlink scheduling to the RS bandwidth positively, generating the bandwidth grant message of the DL-MAPRS, performing the relay processing to the bandwidth grant message of the UL-MAPRS, and sending the bandwidth grant message of the UL-MAPRS after the relay processing and the bandwidth grant message of the DL-MAPRS to the corresponding SS/MSS; or, performing, by the RS, an uplink scheduling and a downlink scheduling to the RS bandwidth passively according to the bandwidth grant message of the DL-MAPRS and UL-MAPRS of the BS, performing the relay processing to the bandwidth grant message of the DL-MAPRS and UL-MAPRS, and sending the bandwidth grant message to the corresponding SS/MSS.

The procedure of gaining, by an SS/MSS, a sending timeslot or a time frequency block for sending the bandwidth request message specifically includes:

selecting, by the SS/MSS requiring to send a bandwidth request, one uplink contention channel of the RS randomly, and sending a contention code to the corresponding RS;

selecting, by the RS, one uplink contention channel of the BS randomly, and sending the contention code of the bandwidth request sent by the SS/MSS to the corresponding BS;

allocating, by the BS, the uplink bandwidth of the BS and RS for the SS/MSS adapted to send the bandwidth request according to the contention code received, and sending the uplink bandwidth information allocated to the RS via the bandwidth grant message of the DL-MAPBS, UL-MAPBS, DL-MAPRS and UL-MAPRS constructed based on the extended frame structure of the BS physical layer; or, allocating, by the BS, the uplink bandwidth of the BS and RS for the SS/MSS adapted to send the bandwidth request according to the received contention code, and sending the uplink bandwidth information allocated to the RS via the bandwidth grant message of the DL-MAPBS, UL-MAPBS and UL-MAPRS constructed based on the extended frame structure of the BS physical layer;

performing, by the RS, a downlink scheduling and an uplink scheduling to the RS bandwidth according to the DL-MAPRS and UL-MAPRS of the BS, and performing the relay processing to the bandwidth grant message of the DL-MAPRS and UL-MAPRS, sending the bandwidth grant message to the corresponding SS/MSS; or, performing, by the RS, an uplink scheduling to the RS passively according to the UL-MAPRS of the BS, performing a downlink scheduling to the RS positively, and generating the bandwidth grant message of the DL-MAPRS positively; performing, by the RS, the relay processing to the UL-MAPRS message only, sending the UL-MAPRS processed to the SS/MSS of the RS, and sending the DL-MAPRS generated positively to the SS/MSS of the RS directly; and gaining, by SS/MSS, the sending timeslot or the time frequency block for sending the bandwidth request message according to the message received.

The procedure of gaining, by an SS/MSS, a sending timeslot or a time frequency block includes:

selecting one code in pseudo random ranging codes of a bandwidth request randomly when the SS/MSS is required to the request bandwidth, and sending the code to the RS by a ranging sub-channel of the RS;

selecting, by the RS, one uplink contention channel of the BS randomly, and performing a retransmission to the pseudo random ranging codes of the bandwidth request sent by the SS/MSS at the uplink contention channel, and sending the pseudo random ranging codes of the bandwidth request to the corresponding BS;

allocating, by the BS, the uplink bandwidth of the BS and RS for the SS/MSS adapted to send the bandwidth request when receiving the pseudo random ranging codes, and sending the uplink bandwidth to the corresponding RS via the bandwidth grant message of the DL-MAPBS, UL-MAPBS, DL-MAPRS and UL-MAPRS constructed based on the extended frame structure of the BS physical layer; or, allocating, by the BS, the uplink bandwidth of the BS and RS for the SS/MSS adapted to send the bandwidth request according to the pseudo random ranging codes received, and sending the allocated uplink bandwidth information to the RS via the bandwidth grant message of the DL-MAPBS, UL-MAPBS, DL-MAPRS and UL-MAPRS constructed based on the extended frame structure of the BS physical layer or the bandwidth grant message of the DL-MAPBS, UL-MAPBS and UL-MAPRS constructed based on the extended frame structure of the BS physical layer;

performing, by the RS, the downlink scheduling and the uplink scheduling to the RS according to the DL-MAPRS and UL-MAPRS of the BS, performing the relay processing to the bandwidth grant message of the DL-MAPRS and UL-MAPRS, and sending the bandwidth grant message to the corresponding SS/MSS; or, performing, by the RS, the uplink scheduling to the RS passively according to the UL-MAPRS of the BS, performing the downlink scheduling to the RS positively, and generating the bandwidth grant message of the DL-MAPRS positively; performing, by the RS, the relay processing to the UL-MAPRS message only, sending the UL-MAPRS processed to the SS/MSS of the RS, and sending the DL-MAPRS generated positively to the SS/MSS of the RS directly;

gaining, by the SS/MSS, the sending timeslot or a time frequency block for sending the bandwidth request message according to the received message.

The DL-MAPBS message, UL-MAPBS message, DL-MAPRS message and UL-MAPRS message comprise a focused contention information element (Focused_Contention_IE) and a broadcast connection identifier (CID).

The bandwidth grant message of the DL-MAPBS, UL-MAPBS, DL-MAPRS and UL-MAPRS comprise a code division multiple access allocation information element (CDMA_Allocation_IE).

The procedure of performing, by the RS, the relay processing to the message further includes:

converting, by the RS, an ingress CID of the message received to a corresponding egress CID, and sending the message to the corresponding BS or SS/MSS according to the connection corresponding to the egress CID; or converting, by the RS, an ingress CID of the message received to a corresponding egress CID, and sending the message to the corresponding subordinate RS according to the connection corresponding to the egress CID; and converting, by the each subordinate RS, the ingress CID of the message received to the corresponding egress CID orderly, performing the relay processing after relaying the message via the connection corresponding to the connection identifier converted, and sending the message processed to the corresponding BS or SS/MSS.

The present invention also provides a system for implementing bandwidth allocation and scheduling management based on a relay station, including: a subscriber station/mobile subscriber station (SS/MSS), a base station (BS) and a relay station (RS);

wherein the SS/MSS comprises a bandwidth request unit and a scheduling management unit; the BS comprises a bandwidth allocation unit and a scheduling management unit; the RS comprises a scheduling management unit and a relay processing unit;

the bandwidth request unit of the SS/MSS is adapted to initiate a bandwidth request;

the scheduling management unit of the SS/MSS is adapted to perform an allocation and a scheduling management to the SS/MSS bandwidth according to a received bandwidth grant information;

the bandwidth allocation unit of the BS is adapted to perform an allocation to an uplink bandwidth and a downlink bandwidth of the BS and an uplink bandwidth of the RS according to the bandwidth request received, and generate a bandwidth grant message of an unlink mapping information unit (UL-MAPRS);

the scheduling management unit of the BS is adapted to perform a scheduling management to the uplink bandwidth and the downlink bandwidth of the BS and the uplink bandwidth of the RS, and send the bandwidth grant message of the UL-MAPRS generated to the RS;

the scheduling management unit of the RS is adapted to perform an uplink scheduling to the RS bandwidth passively according to the bandwidth grant message of the UL-MAPRS of the BS received, and generate a message of a downlink mapping information unit (DL-MAPRS) via performing a downlink scheduling to the RS bandwidth positively; and the relay processing unit of the RS is adapted to relay the bandwidth request message sent from the SS/MSS to the corresponding BS, perform a relay processing to the bandwidth grant message of the UL-MAPRS of the BS received, perform processing to the message of the DL-MAPRS generated, and sending the message of the DL-MAPRS to the SS/MSS.

The RS further includes a bandwidth request unit adapted to initiate a bandwidth request.

The system further includes at least one RS;

wherein the RS performs a corresponding processing according to the message received, performs the relay processing to the message received, and sends the message processed to each corresponding subordinate RS; and the each subordinate RS performs the corresponding processing according to the message received orderly, performs the relay processing to the received message, and sends the message processed to the corresponding BS or SS/MSS.

The present invention also provides another system for implementing bandwidth allocation and scheduling management based on a relay station, including: a subscriber station/mobile subscriber station (SS/MSS), a base station (BS) and a relay station (RS);

wherein the SS/MSS comprises a bandwidth request unit and a scheduling management unit, the BS comprises a bandwidth allocation unit and a scheduling management unit; the RS comprises a scheduling management unit and a relay processing unit;

the bandwidth request unit of the SS/MSS is adapted to initiate a bandwidth request;

the scheduling management unit of the SS/MSS is adapted to perform an allocation and a scheduling management to the SS/MSS bandwidth according to a received bandwidth grant information;

the bandwidth allocation unit of the BS is adapted to perform a allocation to an uplink bandwidth and a downlink bandwidth of the BS and RS according to the bandwidth request received, and generate a bandwidth grant message of an unlink mapping information unit (UL-MAPRS) and a downlink mapping information unit (DL-MAPRS);

the scheduling management unit of the BS is adapted to perform a scheduling management to the uplink bandwidth and the downlink bandwidth of the BS and the uplink bandwidth of the RS, and send the bandwidth grant message of the UL-MAPRS and DL-MAPRS generated to the RS;

the scheduling management unit of the RS is adapted to perform an uplink scheduling and a downlink scheduling to the RS bandwidth passively according to the bandwidth grant message of the DL-MAPRS and UL-MAPRS of the BS;

the relay processing unit of the RS is adapted to relay the bandwidth request message sent from the SS/MSS to the corresponding BS, perform a relay processing to the bandwidth grant message of the DL-MAPRS and UL-MAPRS of the BS received, and send the bandwidth grant message to the SS/MSS.

The RS further includes a bandwidth request unit adapted to initiate a bandwidth request.

The system further includes at least one RS;

wherein the RS performs a corresponding processing according to the message received, performs the relay processing to the message received, and sends the message processed to each corresponding subordinate RS; and the each subordinate RS performs the corresponding processing according to the message received orderly, performs the relay processing to the received message, and sends the message processed to the corresponding BS or SS/MSS.

The present invention also provides a base station apparatus connected to a relay station apparatus, including:

a bandwidth allocation unit adapted to perform an allocation to an uplink bandwidth and a downlink bandwidth of the base station apparatus and an uplink bandwidth of the relay station apparatus according to the bandwidth request received, and generate a bandwidth grant message of an unlink mapping information unit (UL-MAPRS); or the bandwidth allocation unit adapted to perform an allocation to an uplink bandwidth and a downlink bandwidth of the base station apparatus and the relay station apparatus, and generate a bandwidth grant message of an unlink mapping information unit (UL-MAPRS) and a downlink mapping information unit (DL-MAPRS); and a scheduling management unit adapted to perform a scheduling management to the uplink bandwidth and the downlink bandwidth of the BS and the uplink bandwidth of the RS, and send the bandwidth grant message of the UL-MAPRS generated to the RS; or the scheduling management unit adapted to perform a scheduling management to the uplink bandwidth and the downlink bandwidth of the BS and the uplink bandwidth of the RS, and send the bandwidth grant message of the UL-MAPRS and DL-MAPRS generated to the RS.

The present invention also provides a relay station apparatus connected to a base station apparatus and a subscriber station/mobile subscriber station apparatus respectively, including:

a scheduling management unit adapted to perform an uplink scheduling to the relay station apparatus bandwidth passively according to a bandwidth grant message of an uplink mapping information unit (UL-MAPRS) of the base station apparatus received, and generate a message of a downlink mapping information unit (DL-MAPRS) via performing a downlink scheduling to the relay station apparatus bandwidth positively; or the scheduling management unit adapted to perform an uplink scheduling and a downlink scheduling to the relay station apparatus bandwidth passively according to a message of the DL-MAPRS and UL-MAPRS of the BS received; and a relay processing unit adapted to relay a bandwidth request message sent from the subscriber station/mobile subscriber station apparatus to the corresponding BS; perform a relay processing to the bandwidth grant message of the UL-MAPRS of the BS received, perform processing to the message of the DL-MAPRS generated, and send the message of the DL-MAPRS processed to the subscriber station/mobile subscriber station apparatus; or the relay processing unit adapted to relay a bandwidth request message sent from the subscriber station/mobile subscriber station apparatus to the corresponding base station apparatus; performing a relay processing to the bandwidth grant message received of the DL-MAPRS and UL-MAPRS of the base station apparatus, and send the bandwidth grant message to the subscriber station/mobile subscriber station apparatus.

The present invention also provides a subscriber station/mobile subscriber station apparatus, including:

a bandwidth request unit adapted to initiate a bandwidth request;

a scheduling management unit adapted to perform an allocation and a scheduling management to the subscriber station/mobile subscriber station apparatus bandwidth according to a received bandwidth grant information.

In view of the above technical solutions provided by the present invention, the present invention provides a mapping information unit for controlling the RS setting in the frame structure of the BS physical layer, and an extended frame structure of the BS physical layer constructing in the frame structure of the BS physical layer. The BS constructs the mapping information message MAPRS for controlling the RS based on the extended frame structure of the BS physical layer, and implements the bandwidth allocation and the scheduling management of the communication channel of the RS by the RS according to the MAPRS message. According to the present invention, the bandwidth allocation is implemented mainly at the BS, and the service scheduling is implemented mainly at the BS. The RS only performs the uplink or the downlink scheduling of the RS passively, in order to reduce the complexity of the RS effectively. The problem of the multi-hop relay is solved by using the relay of bandwidth request and bandwidth allocation without introducing any complex procedure and technology of the bandwidth request, the allocation and the scheduling management. The complexity of the BWA relay network is simplified. The frame for constructing a bandwidth grant information is defined in the frame structure of the BS. Bandwidth allocation for the links of the RS is performed by the BS. The usage and the location of each burst of the corresponding connections of the SS/MSS which belongs to the RS are indicated by the bandwidth grant information. The RS being the relay of the bandwidth grant information becomes possible.

DETAILED DESCRIPTION OF THE PREFERRED EMBODIMENTS

Figure 1:
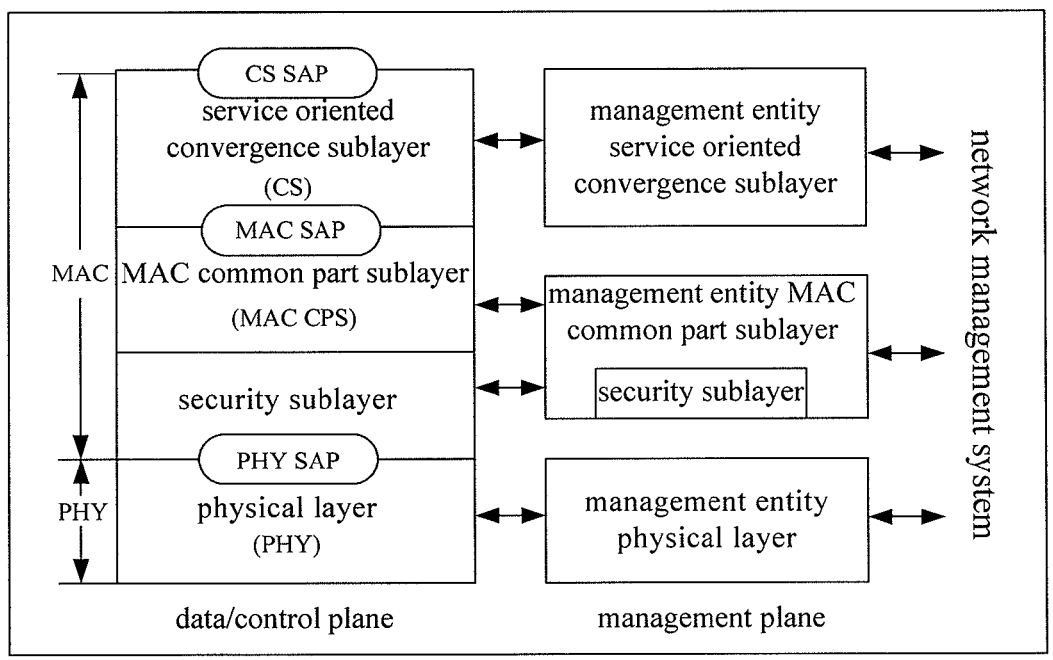
FIG. 1 shows the schematic diagram of the 802.16 protocol layer model.
Figure 2:
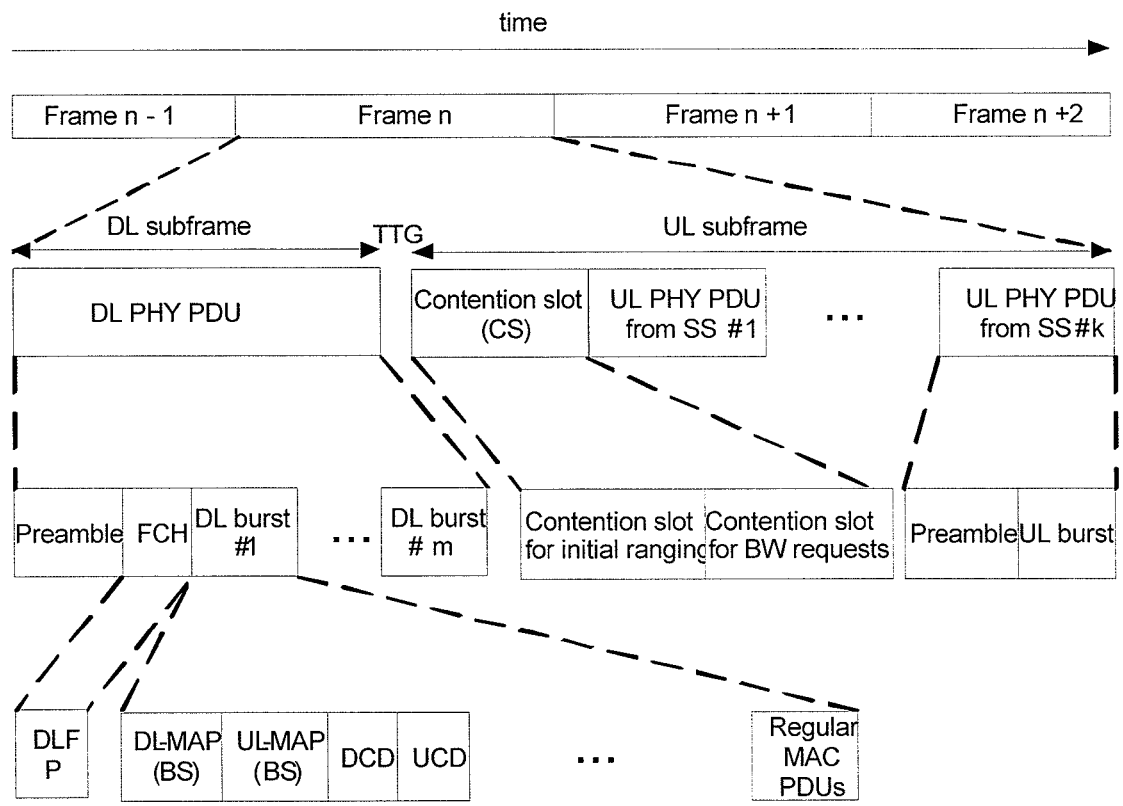
FIG. 2 shows the 802.16 OFDM (or SC) frame structure of the TDD.
Figure 3:
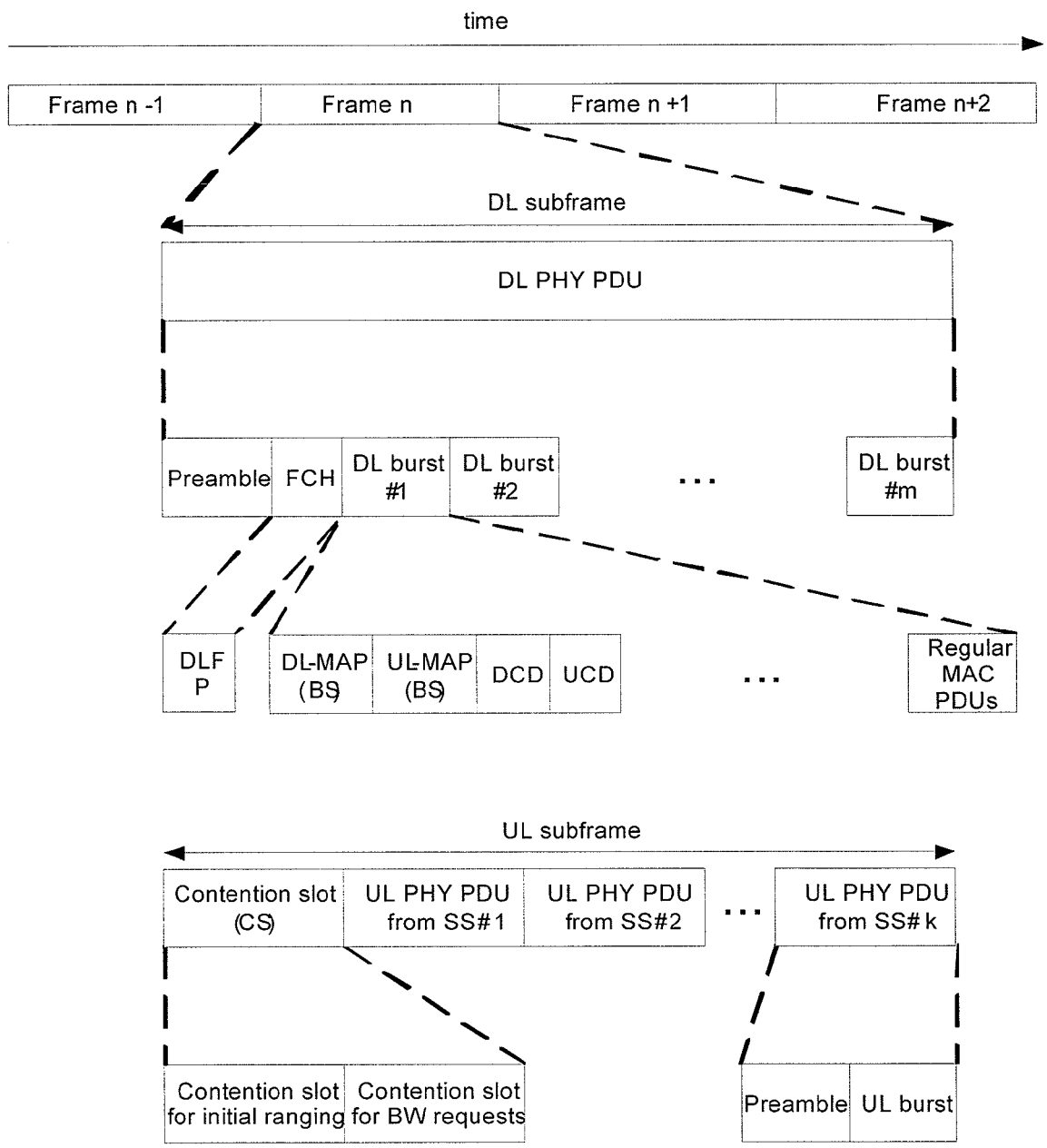
FIG. 3 shows the 802.16 OFDM (or SC) frame structure of the FDD.
Figure 4:
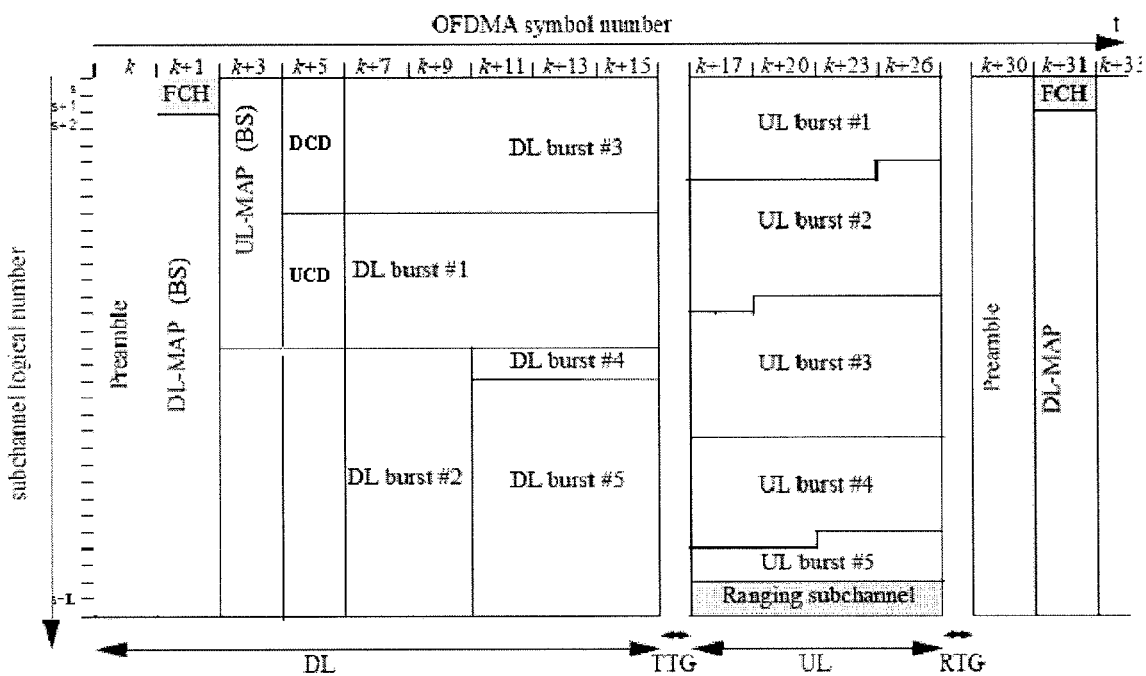
FIG. 4 shows the 802.16 OFDM (or SOFDMA) frame structure of the TDD.
Figure 5:
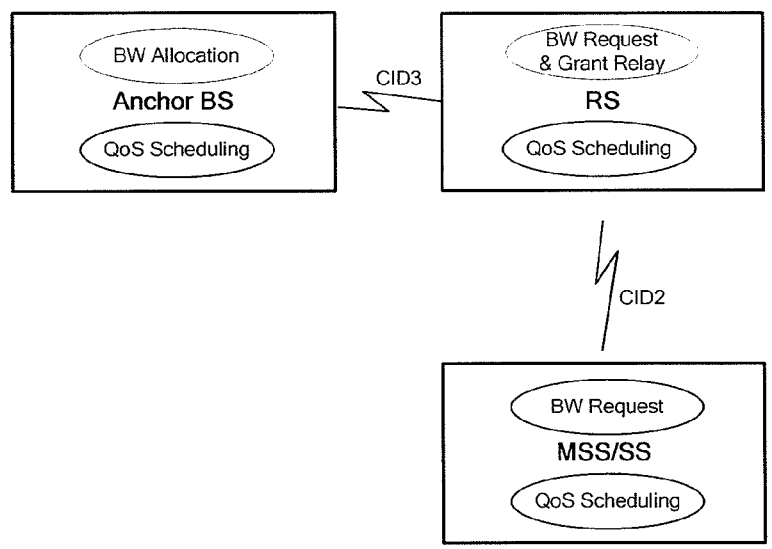
FIG. 5 shows a reference model of bandwidth allocation and scheduling management of single hop BWA relay system according to an embodiment of the present invention.

Regarding the system of the present invention, as shown in FIG. 5, the first embodiment provided by the present invention includes a SS/MSS, a RS and a BS. The BS includes a bandwidth allocation (BW Allocation) unit and a scheduling management (QoS Scheduling) unit. The RS includes a relay processing unit, a bandwidth request unit (BW Request & Grant Relay) and a scheduling management unit. The SS/MSS includes a bandwidth request unit and a scheduling management unit.

The SS/MSS initiates a bandwidth request by the bandwidth request unit; the RS relays the bandwidth request to the BS by the relay processing unit; or the RS initiates a bandwidth request to the BS by the bandwidth request unit of the RS. The bandwidth allocation unit in the BS performs allocating to an uplink bandwidth and a downlink bandwidth of the BS and an uplink bandwidth of the RS according to the bandwidth request received by the BS, and generates a corresponding bandwidth grant message of the UL-MAPRS; the scheduling management unit in the BS performs scheduling management to the uplink bandwidth and the downlink bandwidth of the BS and the uplink bandwidth of the RS, and sends the bandwidth grant message of the UL-MAPRS generated to the RS.

The scheduling management unit of the RS performs the uplink scheduling to the RS bandwidth passively according to the bandwidth grant message of the UL-MAPRS (i.e. UL-MAPRS message) transmitted from the BS, and generates a bandwidth grant message of the DL-MAPRS (i.e. DL-MAPRS message) by performing the downlink scheduling to the RS bandwidth positively; after the relay processing unit of the RS performs a relay processing to the bandwidth grant message of the UL-MAPRS transmitted from the BS, after the relay processing of the UL-MAPRS message, the RS sends the UL-MAPRS message to the SS/MSS.

The scheduling management unit of the SS/MSS performs allocation and scheduling management to the SS/MSS bandwidth according to the bandwidth grant message of the UL-MAPRS and DL-MAPRS received.

Regarding the system of the present invention, the second embodiment provided by the present invention is also shown in FIG. 5. The difference between the second embodiment and the first embodiment is: the bandwidth allocation unit in the BS performing allocation to the uplink bandwidth and the downlink bandwidth of the BS and the RS according to the bandwidth request received by the BS, and generates the bandwidth grant message of the UL-MAPRS and the bandwidth grant message of the DL-MAPRS. The scheduling management unit in the BS performs scheduling management to the uplink bandwidth and the downlink bandwidth of the BS and the uplink bandwidth of the RS, and sends the bandwidth grant message of the UL-MAPRS and DL-MAPRS to the RS. The scheduling management unit of the RS performs the uplink scheduling and the downlink scheduling of the RS bandwidth passively according to the DL-MAPRS message and UL-MAPRS message transmitted from the BS. After the relay processing unit of the RS performs the relay processing to the bandwidth grant message of the DL-MAPRS and UL-MAPRS transmitted from the BS, the relay processing unit of the RS sends the bandwidth grant message to the SS/MSS.

Figure 6:
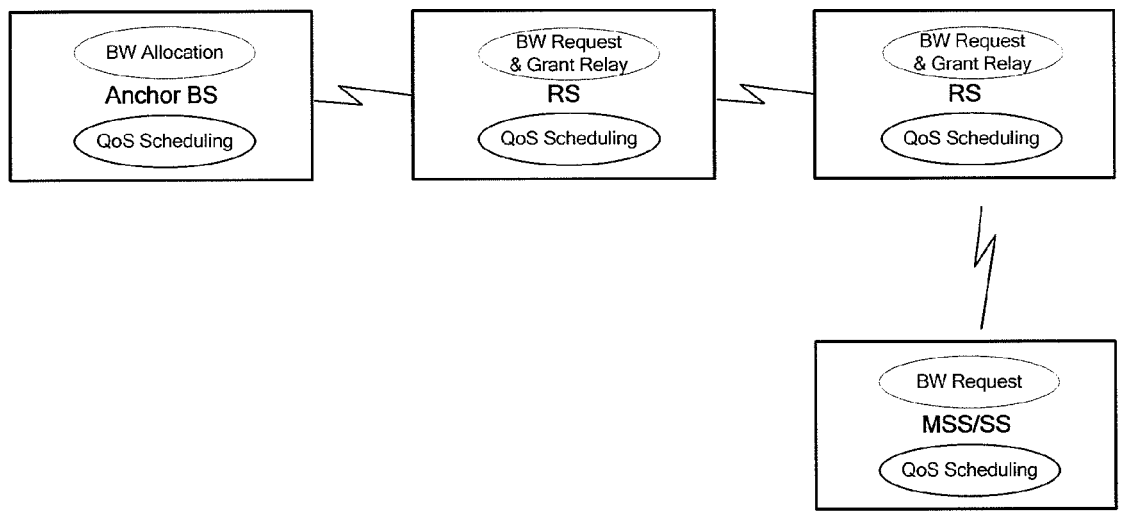
FIG. 6 shows a reference model of bandwidth allocation and scheduling management of the multi-hop BWA relay system according to an embodiment of the present invention.

As shown in FIG. 6, the present invention provides the third and the fourth embodiments according to the first and the second embodiments provided by the present invention respectively. The difference between the third, the fourth embodiments and the first, the second embodiments is: the third and the fourth embodiments include several RSs.

In the third and the fourth embodiments, since the system includes several RSs, the RS sends the information to the corresponding subordinate RS after performing corresponding processing according to the information received and the relay processing to the information received. Each subordinate RS performs the corresponding processing according to the information received, and performs the relay processing to the information received, and sends the information processed to the corresponding BS or the SS/MSS. The corresponding processing performed by the RS according to the information received is the same as the processing procedure in the first embodiment.

Regarding the method of the present invention, the fifth embodiment provided by the present invention, firstly, sets a DL-MAPRS (Downlink mapping information unit for controlling a RS) and an UL-MAPRS (Uplink mapping information unit for controlling the RS) in a frame structure of the BS physical layer, and constructs an extended frame structure of the BS physical layer.

The DL-MAPRS and UL-MAPRS is located in the downlink sub-frame of the extended frame structure of the BS physical layer adapted to define a usage and a location of each burst of the corresponding connection of the SS/MSS which belongs to the RS. For the SC, the uplink bandwidth allocation (UL-MAP) uses minislot as unit. For the OFDM or the OFDMA, the uplink bandwidth allocation (UL-MAP) uses symbol and sub-channel as unit.

Figure 7:
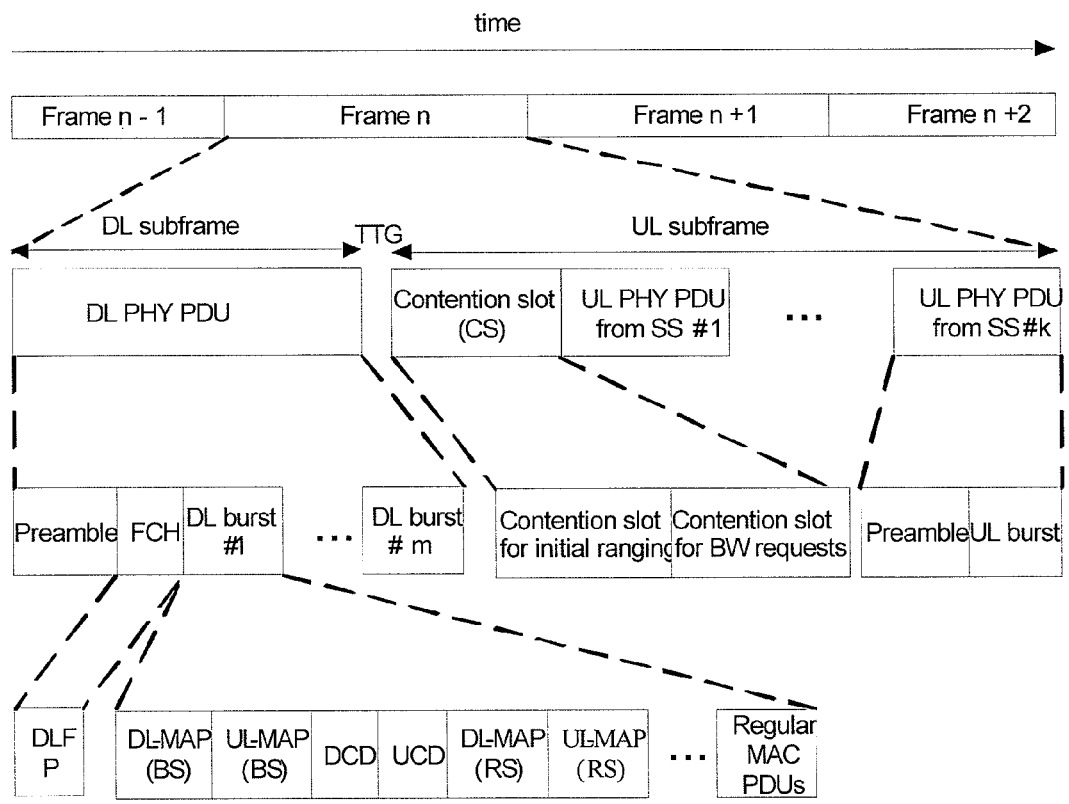
FIG. 7 shows an OFDM (or SC) frame structure of the BS of the TDD relay system according to an embodiment of the present invention.
Figure 8:
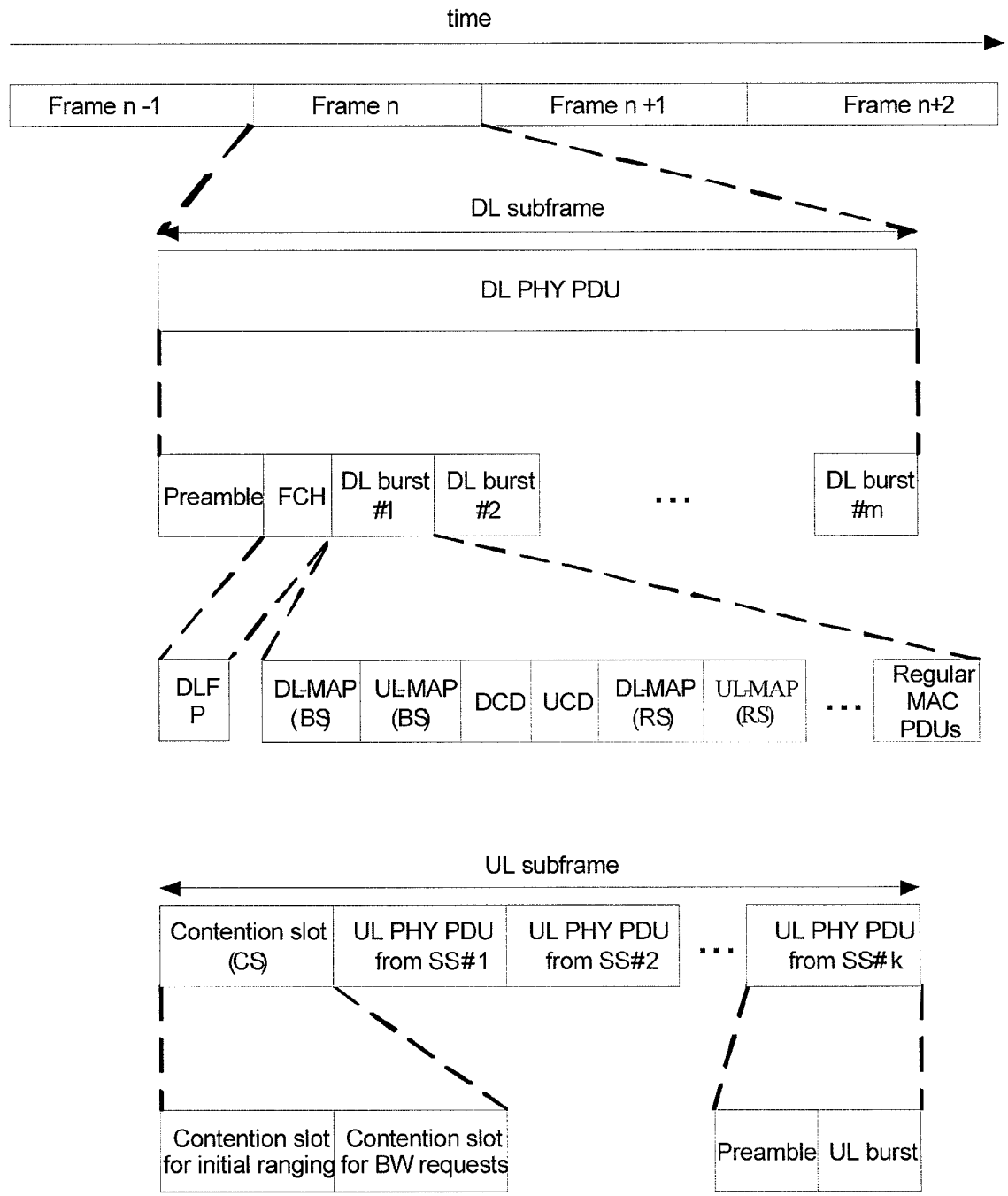
FIG. 8 shows the schematic diagram of an OFDM (or SC) frame structure of the BS of the FDD relay system according to an embodiment of the present invention.
Figure 9:
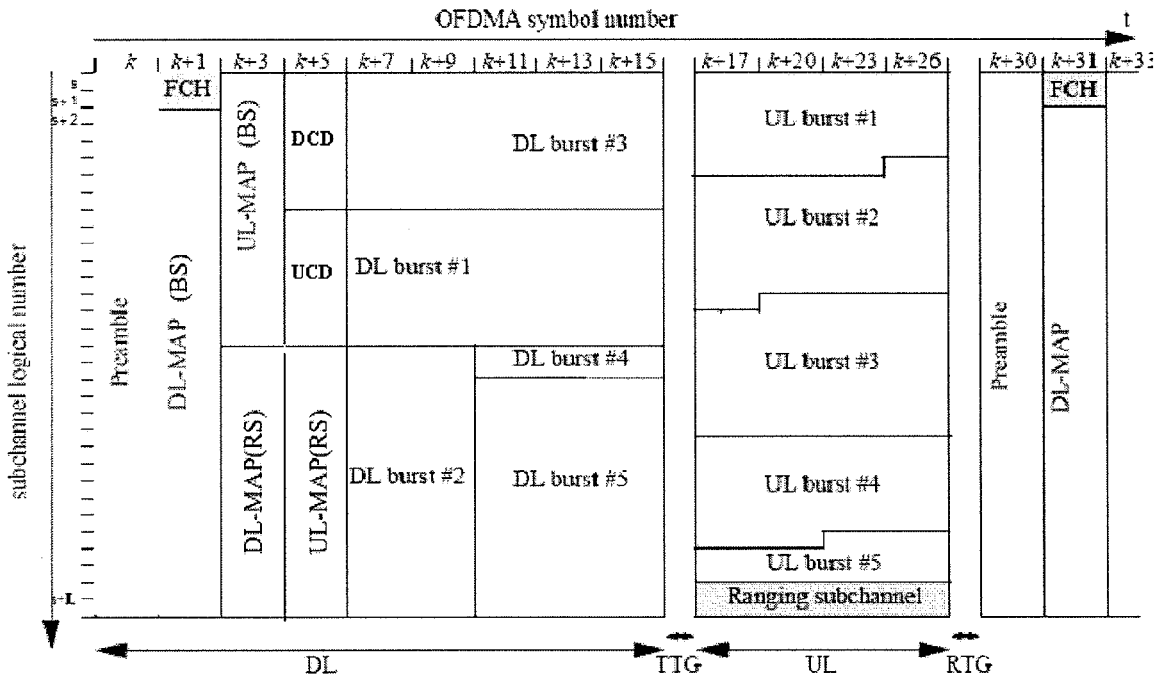
FIG. 9 shows the schematic diagram of an OFDMA (or SOFDMA) frame structure of the BS of the TDD relay system according to an embodiment of the present invention.

FIG. 7 is a schematic diagram of the OFDM (or SC) frame structure of the BS in the TDD relay system. FIG. 8 is a schematic diagram of the OFDM (or SC) frame structure of the BS in the FDD relay system. FIG. 9 is a schematic diagram of the OFDMA (or SOFDMA) frame structure of the BS in the TDD relay system. The OFDMA (or SOFDMA) frame structure of the BS in the FDD relay system is similar to FIG. 9. The difference is that the uplink sub-frame and the downlink sub-frame of the latter are sent at different frequencies simultaneity.

Concrete format and content definition of the DL-MAPRS and UL-MAPRS message constructed based on the extended frame structure of the BS, may follow the concrete format and content definition of the DL-MAPRS and UL-MAPRS message in the existing 802.16 standard.

As shown in the extended frame structure of the BS physical layer, the DL-MAPRS message may closely follow the DCD message and the UCD message or closely follow the DL-MAPBS message and UL-MAPBS message if the DL-MAPRS message is sent in the current frame. The UL-MAPRS message may closely follow the DL-MAPRS message if the DL-MAPRS message is sent in the current frame; the UL-MAPRS message may closely follow the DCD message and the UCD message if the DL-MAPRS is not sent in the current frame; or the UL-MAPRS message may closely follow the DL-MAPBS message and UL-MAPBS message if the DL-MAPRS is not sent in the current frame. If the DCD message and the UCD message are sent in the current frame, the DCD message and UCD message may closely follow the DL-MAPBS and UL-MAPBS, or closely follow the DL-MAPRS and UL-MAPRS. The DL-MAPBS, UL-MAPBS, DL-MAPRS, UL-MAPRS, DCD and UCD may be sent at DL Burst #1.

When the bandwidth request (BW Request) is initiated by the MSS/SS, the RS performs a bandwidth request relay (BW Request Relay). The RS itself may also initiate the BW Request. The anchor BS implements bandwidth allocation (BW Allocation) according to the bandwidth request received, i.e. the anchor BS performs allocation to the uplink bandwidth and the downlink bandwidth of the BS and the RS respectively, and constructs the DL-MAPBS message and UL-MAPBS message. The anchor BS also constructs the DL-MAPRS message and UL-MAPRS message based on the extended frame structure of the BS physical layer.

The BS sends the DL-MAPBS message and UL-MAPBS message constructed, the DL-MAPRS and UL-MAPRS message to the RS, after the BS performs the uplink and the downlink bandwidth allocation of the BS and the RS. The usage and the location of each burst of the corresponding connection of the SS/MSS belonging to the BS is indicated in the DL-MAPBS message and UL-MAPBS message sent from the BS to the RS. The usage and the location of each burst of the corresponding connection of the SS/MSS belonging to the RS is indicated in the DL-MAPRS message and UL-MAPRS message from the BS to the RS.

When RS performs a relay of the DL-MAPRS message and UL-MAPRS message, i.e., a bandwidth allocation relay, service scheduling is mainly implemented at the BS. The RS performs the uplink scheduling or the downlink scheduling of the RS passively only according to the DL-MAPRS and UL-MAPRS of the BS.

Figure 10:
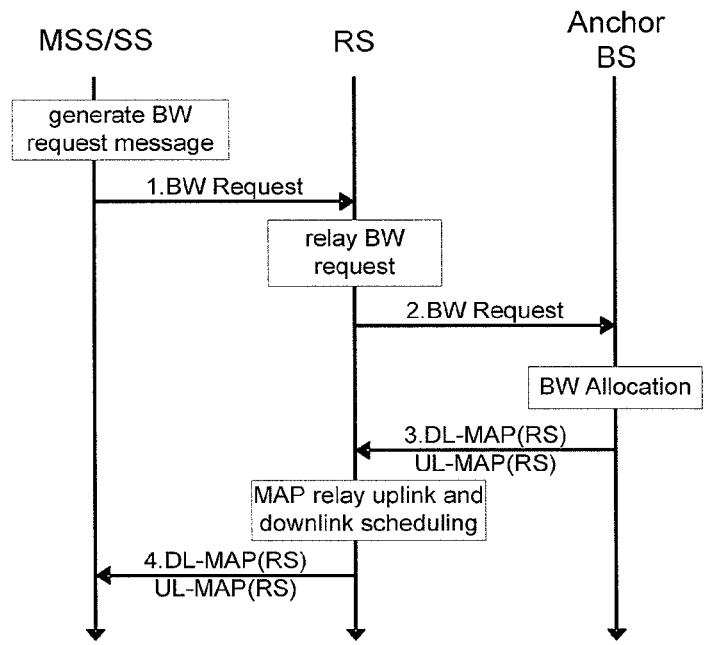
FIG. 10 shows a flow chart of a relay of the bandwidth request of the BWA relay system according to an embodiment of the present invention.

The sixth embodiment provided by the present invention as shown in FIG. 10 includes as follows.

Step 1, the SS/MSS initiates a bandwidth request according to the appointed broadcast, multicast or unicast Request IE in the UL-MAPRS message of the BS relayed by the RS.

Through the Request IE, the BS describes a time interval for requesting a transmission bandwidth of the uplink data by the uplink. The characteristic of the IE is decided by the CID type. For the broadcast or the multicast, all the SS/MSSs are required to participate competing the bandwidth request; For the unicast CID, the bandwidth is applied for every particular connection.

The bandwidth request means a mechanism for notifying the BS of the required uplink bandwidth by the SS/MSS. There are several modes for sending the bandwidth request message by the SS/MSS.

1. Sending BW request in a competing period of time. The competing period of time usually means the broadcast/multicast polling (broadcast/multicast Polling). The mode may generate collision, and the random backoff is required considering.

2. Sending the BW request using the unicast polling (Unicasting Polling) allocated by the BS. To an rt-Polling or an nrt-Polling service flow, the BS may allocate the unicast Polling period of time for them. The SS/MSS sends bandwidth request in this period of time, and the collision may be avoided.

3. Sending a piggyback (Piggyback) bandwidth request using an opportunity of data sending.

The BW Request may have one of the two attributes as follows.

1. Increment: the BS adds the bandwidth applied by the Request based on the current comprehension of the bandwidth requirement of the CID when receiving an incremental BW request.

2. Aggregate: the BS replaces the current comprehension of the bandwidth requirement of the CID when receiving an aggregative BW Request.

In addition, to the different physical layer modes, the mechanism of sending the BW Request in the contention period of time differs too.

The bandwidth request message may adopt a separate bandwidth request header, for example, mode 1 and mode 2, or express as a sort of carrying information, for example, mode 3, the carrying mode is optional.

The Polling is a procedure that the BS allocates the bandwidth used to send the uplink BW Request for the SS/MSS. The Polling may be for single SS, and may be for a group of SSs as well. The former is called a unicast Polling, and the latter is called a multicast Polling. The multicast Polling may generate collision at the contention period of time, thus the random backoff is required considering.

The detailed implementation method of the unicast Polling is as follows. The BS allocates enough bandwidth for sending the BW Request for the Basic CID of the SS/MSS. Usually one Data Grant IE pointed to the Basic CID of the SS/MSS is allocated in the UL-MAP. Allocation for a group of SSs practically means defining a Bandwidth Request Contention IE.

If the resources expenditure of the unicast Polling is too much for the BS, the multicast Polling mode may be adopted. A group of SS/MSSs send the BW Request at the contention period of time for the multicast Polling. A specific multicast CID or broadcast CID may be defined.

To the SS/MSS having UGS service flow currently, the BS may be notified through the PM (Poll-me) bit. The SS/MSS requires one unicast Polling for a non-UGS connection.

The Polling uses SS/MSS as unit, while the bandwidth request uses connection as unit.

Step 2, the bandwidth request message is performed a relay processing by the relay station RS, and the bandwidth request message after the relay processing is sent to the BS.

The relay processing of the BW Request requires performing the CID conversion to the BW Request message. A CID remapping table maintained in the RS is shown in Table 1. Wherein the connection of the RS→BS is CID3 (egress CID=0x8b), and the connection between MSS/SS→RS is CID2 (ingress CID=0x3f). The relay processing of the BW Request requires converting CID in the BW Request message from ingress CID=0x3f to egress CID=0x8b.

TABLE 1

| Num. | SFID | Ingress CID | Egress CID | QoS | ... |
|---|---|---|---|---|---|
| 1 | 0x7426 | 0x3f (i.e. CID2) | 0x8b (i.e. CID3) | rt-polling | ... |
| 2 | 0x1694 | 0x49 | 0xa1 | BE | ... |
| 3 | ... | ... | ... | ... | ... |

When the BW Request message performs the relay through one RS, the RS converts the ingress CID of the message received to the corresponding egress CID, and send the message to the corresponding BS or SS/MSS according to the corresponding connection with the egress CID.

When the BW Request message performs the relay through several RSs, firstly, the RS converts the ingress CID of the message received to the corresponding egress CID, and sends the message to the corresponding subordinate RS according to the corresponding connection with the egress CID. Each subordinate RS converts the ingress CID of the message received to the corresponding egress CID orderly, performs the relay processing after relaying the message through the corresponding connection to the converted connection identifier, until the message is sent to the corresponding BS or SS/MSS.

Step 3, the BS performs bandwidth allocation and scheduling management according to the bandwidth request message, constructs a bandwidth grant information based on the extended frame structure of the BS physical layer, and transmits the bandwidth grant information to the RS.

In this step, firstly, the BS performs bandwidth allocation according to the bandwidth request message; secondly, the BS performs the bandwidth grant (Grants). The procedure of the bandwidth grant is as follows. The DL-MAPRS message and UL-MAPRS message is constructed based on the extended frame structure of the BS physical layer, and the usage and the location of each burst of the corresponding connection of the SS/MSS belonging to the RS is indicated in the constructed information; finally, the constructed information is sent to the RS. The BS indicates the usage and the location of each burst of the corresponding connection of the SS/MSS belonging to the BS in the DL-MAPBS message and UL-MAPBS message sent to the RS.

Step 4, the RS performs the uplink scheduling and the downlink scheduling according to the bandwidth grant information received, performs the relay processing to the information, and sends the information to the SS/MSS.

The RS performs the downlink scheduling and the uplink scheduling of the RS passively according to the DL-MAPRS message and UL-MAPRS message transmitted from the BS. The RS performs the relay of the DL-MAPRS message and UL-MAPRS message, i.e. the bandwidth allocation relay. The bandwidth allocation relay may pass through a multi-hop RS. The RS may convert the DL-MAPRS and UL-MAPRS message sent from the anchor BS to the DL-MAP and the UL-MAP message of the RS downlink sub-frame as the original sample, and send the DL-MAP and the UL-MAP to the SS/MSS belonging to the RS. This requires that the anchor BS is able to acquire and adjust the time delay brought from the RS relay precisely.

The RS may convert the DL-MAPRS message and UL-MAPRS message to the DL-MAP and the UL-MAP of the RS downlink sub-frame, after performing the time delay adjustment to the Grants allocated by the BS that is described in the DL-MAPRS message and UL-MAPRS message sent from the anchor BS, and send the DL-MAP and the UL-MAP to the SS/MSS belonging to the RS. This mode does not require that the anchor BS gains and adjusts the time delay brought by the RS relay.

The relay processing of the DL-MAPRS message and UL-MAPRS message also requires checking the CID remapping table to perform the CID converting to the DL-MAPRS and UL-MAPRS message.

Step 5, the SS/MSS selects the corresponding connection and the location on the connection according to the information in the bandwidth grant information, and interacts the information with the BS at the location though the connection.

Through receiving the DL-MAP message and the UL-MAP message of the downlink sub-frame of the RS, the SS/MSS acquires bandwidth allocation and the grant results of the anchor BS. The corresponding connection of the SS/MSS may send the information to the RS at the appointed burst location.

Regarding the method of the present invention, the seventh embodiment provided by the present invention, firstly, sets a UL-MAPRS in the frame structure of the BS, and constructs an extended frame structure of the BS physical layer.

The UL-MAPRS is located in the downlink sub-frame of the extended frame structure of the BS physical layer adapted to define the usage and the location of each burst of the corresponding connection of the SS/MSS belonging to the RS. For the SC, the uplink bandwidth allocates minislot as unit; for the OFDM or the OFDMA, the uplink bandwidth allocates symbol and sub-channel as unit.

Also taking FIG. 7, FIG. 8 and FIG. 9 as example perform explanation.

As shown in the extended frame structure of the BS physical layer, the UL-MAPRS is set in the downlink sub-frame of the frame structure of the BS physical layer, and the sending time slot of the UL-MAPRS is set behind the DCD and/or UCD, or behind the DL-MAPBS and UL-MAPBS. The DL-MAPBS, UL-MAPBS, UL-MAPRS, DCD and UCD are sent at the DL Burst #1.

When the bandwidth request is initiated by the SS/MSS, the RS performs the BW Request Relay (bandwidth request relay). The RS itself may also initiate a BW Request. The anchor BS implements bandwidth allocation (BW Allocation) according to the bandwidth request received, i.e. the anchor BS performs allocation to the uplink bandwidth and the downlink bandwidth of the BS and the uplink bandwidth of the RS respectively, and constructs the DL-MAPBS message and UL-MAPBS message. The anchor BS constructs the UL-MAPRS message based on the extended frame structure of the BS physical layer.

The BS performs the allocation to the uplink bandwidth and the downlink bandwidth of the BS and the uplink bandwidth of the RS respectively. The RS performs the allocation to the downlink bandwidth of the RS. The BS sends the constructed DL-MAPBS message, UL-MAPBS message and UL-MAPRS message to the RS. The usage and the location of each burst of the corresponding connection of the SS/MSS belonging to the BS are indicated in the UL-MAPBS message sent to the RS. The usage and the location of each burst of the corresponding connection of the SS/MSS belonging to the RS are indicated in the DL-MAPRS message and UL-MAPRS message sent to the RS.

The RS performs a relay of the UL-MAPRS message (i.e. a bandwidth allocation relay). Service scheduling is mainly implemented in the BS. The RS performs the uplink scheduling of the RS passively according to the DL-MAPBS and UL-MAPBS of the BS, and the RS performs the downlink scheduling of the RS positively.

The eighth embodiment provided by the present invention still shown in FIG. 10 includes as follows.

Step 1, the SS/MSS initiates the bandwidth request. Detailed explanation is similar to the relevant description in the sixth embodiment.

Step 2, the bandwidth request message is performed a relay processing by the relay station RS, and the bandwidth request message after the relay processing is sent to the BS. Detailed explanation is similar to the relevant description in the sixth embodiment.

Step 3, the BS performs bandwidth allocation and scheduling management according to the bandwidth request message received, constructs a bandwidth grant information based on the extended frame structure of the BS physical layer, and sends it to the RS afterward.

In the step, firstly, the BS performs the allocation of the uplink bandwidth and the downlink bandwidth of the BS and the uplink bandwidth of the RS according to the bandwidth request message; secondly, the BS performs the bandwidth grant (Grants). The procedure of the bandwidth grant is as follows. The UL-MAPRS message is constructed based on the extended frame structure of the BS physical layer, and the usage and the location of each burst of the corresponding connection of the SS/MSS belonging to the RS are indicated in the message. The usage and the location of each burst of the corresponding connection of the SS/MSS belonging to the RS is indicated in the DL-MAPBS and UL-MAPBS message. Finally, the message is sent to the RS.

Step 4, the RS performs the corresponding processing according to the message of the DL-MAPBS and UL-MAPBS received, performs the relay processing to the UL-MAPRS message sent from the BS, and sends the UL-MAPRS message to the SS/MSS.

The RS performs the uplink scheduling of the RS passively according to the UL-MAPRS message of the BS, and performs the downlink scheduling of the RS positively. The DL-MAPRS generated positively is sent to the subscriber SS/MSS of the RS. Detailed explanation for the remaining parts is similar to the relevant descriptions in the sixth embodiment.

Step 5, the SS/MSS selects the corresponding connection and the location on the connection according to the bandwidth grant information received, and interacts the information with the BS at the location through the connection.

Through receiving the DL-MAPRS message and UL-MAPRS message in the downlink sub-frame of the RS, the SS/MSS acquires bandwidth allocation and the grant results of the anchor BS. The corresponding connection of the SS/MSS may send the message to the RS at the appointed burst location.

The ninth embodiment provided by the present invention includes as follows.

Step 1, the BS allocates the uplink bandwidth of the RS positively and notifies the RS of the uplink bandwidth through the UL-MAPRS message.

Step 2, when receiving the uplink UL-MAPRS message sent by the BS, the RS performs the uplink scheduling to the RS bandwidth passively according to the UL-MAPRS message, performs the downlink scheduling of the RS positively, and generates the downlink DL-MAPRS message positively. The RS performs a relay processing to the UL-MAPRS message, and sends the UL-MAPRS after the relay processing to the SS/MSS of the RS. The RS sends the DL-MAPRS which is generated by the RS positively to the SS/MSS of the RS.

Figure 11:
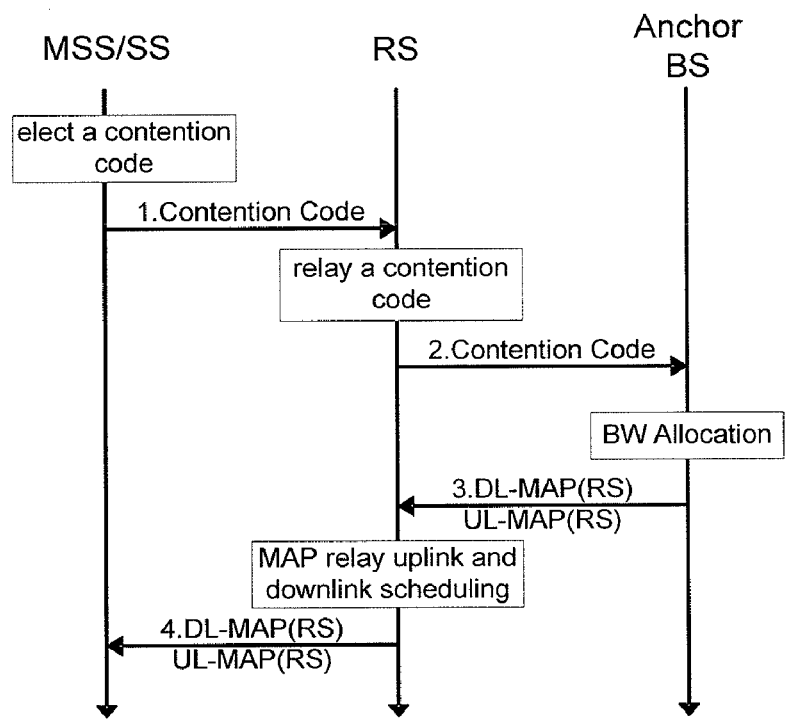
FIG. 11 shows a first phase flow chart of the OFDM physical layer bandwidth request mechanism according to an embodiment of the present invention.

The tenth embodiment provided by the present invention is a bandwidth request mechanism based on the contention supported by the OFDM physical layer, including two phases. The first phase: the REQ Region-Focused bandwidth request flow of the OFDM physical layer is shown in FIG. 11:

Step 1, the SS/MSS requiring sending a bandwidth request, selects one uplink contention channel of the RS for sending a contention code to the corresponding RS randomly.

The SS/MSS requiring sending a bandwidth request, firstly, selects one uplink sending opportunity of the RS randomly in the period of the REQ Region-Focused, i.e. sending the contention code in the contention channel.

Step 2, the RS selects a contention channel of the BS randomly, and after performing the relay processing to the contention code of the bandwidth request sent by the SS/MSS, the RS sends the contention code of the bandwidth request to the corresponding BS. The detailed procedure is as follows. The RS selects an anchor BS uplink sending opportunity randomly, i.e. the contention channel, and transmits the contention code of the bandwidth request of the SS/MSS. The bandwidth request contention code may pass through the multi-hop RS.

Step 3, when the BS receives the contention code, the anchor BS allocates the uplink bandwidth of the BS and RS for the SS/MSS in order to send the bandwidth request, and sends the uplink bandwidth to the RS through the DL-MAPBS message, UL-MAPBS message, DL-MAPRS message and UL-MAPRS message; or sends the uplink bandwidth to the RS through the DL-MAPBS message, UL-MAPBS message, and UL-MAPRS message. In this embodiment, the uplink bandwidth allocation does not require instruction from the BASIC CID, instead of, requires the broadcast CID and the OFDM Focused_Contention_IE to instruct together. The OFDM Focused_Contention_IE includes a contention channel, a contention code and a sending opportunity used by the SS/MSS. In this way, the SS/MSS may know whether the BS allocates the uplink opportunity for the SS/MSS according to the parameters used by the SS/MSS just now.

Step 4, the RS performs the downlink scheduling and the uplink scheduling of the RS passively according to the DL-MAPRS and UL-MAPRS of the BS, and after performing the relay processing to the bandwidth grant message of the DL-MAPRS and UL-MAPRS, sends the bandwidth grant message to the corresponding SS/MSS; or, the RS performs the uplink scheduling of the RS passively according to the UL-MAPRS of the BS, performs the downlink scheduling of the RS positively, and generates the bandwidth grant message of the DL-MAPRS positively. The RS performs the relay processing to the UL-MAPRS message only, and sends the UL-MAPRS after the relay processing and DL-MAPRS generated positively to the SS/MMS of the RS.

Above informations may pass through the multi-hop RS. The RS requires checking the CID remapping table when performing the relay processing to the DL-MAPRS message and UL-MAPRS message, and performs the CID converting to the DL-MAPRS message and UL-MAPRS message. No more details here.

Step 5, the SS/MSS acquires the contention channel for sending the bandwidth request message according to the message received.

After receiving the relayed UL-MAPRS, the SS/MSS judges itself whether having an opportunity to send the bandwidth request.

The second phase: bandwidth allocation and the request mechanism are similar to the detailed implementation procedure in the sixth or the eighth embodiment, no more details here.

The bandwidth request mechanism based on the contention supporting by the OFDM physical layer also supports the bandwidth request mechanism based on the contention as in the sixth embodiment or the eight embodiment, besides the implementation procedure described in the tenth embodiment.

Figure 12:
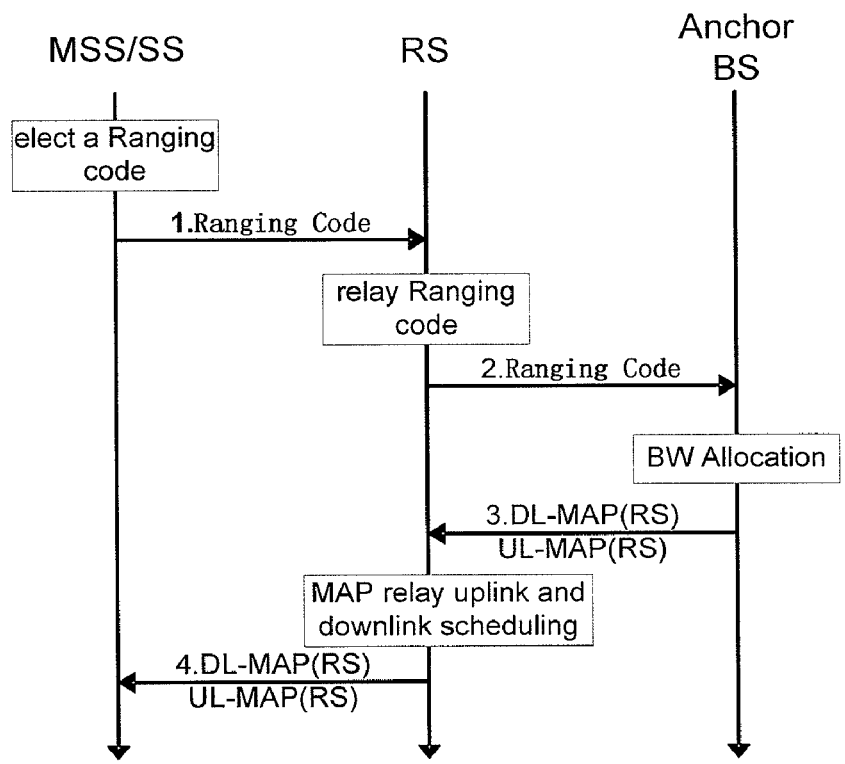
FIG. 12 shows a first phase flow chart of the OFDMA physical layer bandwidth request mechanism according to an embodiment of the present invention.

The present invention provides the eleventh embodiment, regarding the OFDMA physical layer, defining a Ranging sub-channel and a group of special pseudo random Ranging codes. The pseudo random codes are divided into three types of the Initial Ranging, the Period Ranging and the Bandwidth Request. The OFDMA physical layer supports the CDMA bandwidth request mechanism based on the contention, which is divided into two phases. The first phase: the OFDMA physical layer bandwidth request procedure is shown in FIG. 12, including as follows.

Step 1, when the SS/MSS requires requesting bandwidth, the SS/MSS selects a code from the pseudo random Ranging codes of the Bandwidth Request, and sends the code to the RS in the Ranging sub-channel of the RS.

Step 2, the RS selects one uplink contention channel of the BS randomly, for example the Ranging sub-channel, and sends the pseudo random Ranging code chose by the SS/MSS randomly to the corresponding BS in the uplink contention channel. The pseudo random Ranging code may pass through the multi-hop RS.

Step 3, after receiving the pseudo random Ranging code by the BS, the anchor BS allocates the uplink bandwidth of the BS and RS for the SS/MSS adopted to send the bandwidth request, and sends the bandwidth request to the RS through the DL-MAPBS message, UL-MAPBS message, DL-MAPRS message and UL-MAPRS message; or sends the bandwidth request to the RS through the DL-MAPBS message, UL-MAPBS message and UL-MAPRS message.

The uplink bandwidth is implemented through allocating a CDMA_Allocation_IE carrying the information of a sending region and a ranging code in the UL-MAP.

Step 4, the RS performs the downlink scheduling and the uplink scheduling of the RS passively according to the DL-MAPRS and UL-MAPRS of the BS, and after performing the relay processing to the bandwidth grant message of the DL-MAPRS and UL-MAPRS, sends the bandwidth grant message to the corresponding SS/MSS; or, the RS performs the uplink scheduling of the RS passively according to the UL-MAPRS of the BS, performs the downlink scheduling of the RS positively, and generates the bandwidth grant message of the DL-MAPRS positively; the RS performs the relay processing to the UL-MAPRS message only, sends the UL-MAPRS processed to the SS/MSS of the RS, and sends the DL-MAPRS generated positively to the SS/MSS of the RS directly.

Step 5, after receiving the relayed UL-MAPRS, the SS/MSS may decide whether the uplink sending opportunity belongs to the SS/MSS itself according to the information carried in the CDMA_Allocation_IE. If the uplink sending opportunity belongs to the SS/MSS itself, the SS/MSS sends the bandwidth request and data by the sending opportunity.

The second phase, bandwidth allocation and the request mechanism is similar to the detailed implementation procedure in the sixth embodiment or the eighth embodiment, no more details here.

The bandwidth request mechanism based on the contention supported by the OFDMA physical layer also supports the bandwidth request mechanism based on the contention as in the sixth embodiment or the eight embodiment, besides the detailed implementation procedure described in the eleventh embodiment.

In view of the above embodiments of the present invention, it existing the following beneficial results:

1. Bandwidth allocation (BW Allocation) is implemented only at the anchor BS, and bandwidth allocation is implemented mainly at the BS; and the service scheduling is implemented mainly at the BS. The complexity of the RS is reduced effectively.

2. The multi-hop relay problems are solved by the relay of the bandwidth request and bandwidth allocation, without introducing any complex procedures and technology of the bandwidth request, the allocation and the scheduling management. The complexity of the BWA relay network is simplified.

3. The DL-MAPRS and UL-MAPRS are defined in the frame structure of the BS physical layer. The anchor BS performs bandwidth allocation of the RS, The usage and the location of each burst of the corresponding connection belonging to the SS/MSS of the RS are indicated through the DL-MAPRS and UL-MAPRS or the UL-MAPRS only. It makes the RS only perform bandwidth allocation to the DL-MAPRS message and UL-MAPRS message becoming possible. Or the UL-MAPRS is defined in the frame structure of the BS physical layer. The anchor BS performs the allocation to the uplink bandwidth of the RS. The usage and the location of each burst of the corresponding connection of the SS/MSS belonging to the RS are indicated through the UL-MAPRS. It becomes possible that the RS performs the relay of bandwidth allocation of the UL-MAPRS message and generates the DL-MAPRS positively according to the information sent by the BS.

Though illustration and description of the present disclosure have been given with reference to embodiments thereof, it should be appreciated by persons of ordinary skill in the art that various changed in forms and details can be made without deviation from the spirit and scope of this disclosure, which are determined by the appended claims.

What is claimed is:

1. A method for implementing bandwidth allocation based on a relay station (RS), in a Bandwidth Wireless Access (BWA) system, comprising:
   receiving, by a base station (BS) a bandwidth request message from a subscriber station/mobile subscriber station (SS/MSS) relayed by the RS;
   performing, by the BS, bandwidth allocation for the link of the RS, and generating a bandwidth grant information which reflects the corresponding bandwidth allocation, wherein the bandwidth grant information comprises a UL-MAP$_{RS}$ message which is adapted to bandwidth allocation for the uplink of the RS and a DL-MAP$_{RS}$ message which is adapted to bandwidth allocation for the downlink of the RS, and usage and location of each burst of corresponding connection of the SS/MSS belonging to the RS is indicated in the DL-MAP$_{RS}$ message and the UL-MAP$_{RS}$ message;
   sending, by the BS, the bandwidth grant information to the RS; and
   performing, by the RS, a relay processing to the UL-MAP$_{RS}$ message and the DL-MAP$_{RS}$ message and transmitting the UL-MAP$_{RS}$ message and the DL-MAP$_{RS}$ message to the SS/MSS or a subordinate RS.

2. The method according to claim 1, wherein the BS acquires and adjusts a time delay brought by the RS relayed.

3. The method according to claim 1, wherein the procedure of performing, by the RS, a relay processing comprises:
   transforming, by the RS, a ingress connection identifier (CID) to a corresponding egress CID of the received bandwidth grant message, and sending the bandwidth grant message to the corresponding SS/MSS or the subordinate RS according to a connection corresponding to the egress CID.

4. The method according to claim 1, wherein the method further comprises:
   transforming, by the RS, the bandwidth grant information to a bandwidth grant message of the RS according to the received bandwidth grant information, and sending the bandwidth grant message of the RS to the SS/MSS or the subordinate RS.

5. The method according to claim 1, wherein the procedure of generating, by the BS, the corresponding bandwidth grant information comprises:
   constructing, by the BS, the bandwidth grant information corresponding to bandwidth allocation for the link of the RS based on an extended frame structure of the BS physical layer.

6. The method according to claim 5, wherein the bandwidth grant information for the RS is constructed following a bandwidth grant information which reflects bandwidth allocation between the BS and the SS/MSS or the subordinate RS.

7. The method according to claim 1, wherein the method further comprises a procedure of obtaining, by the SS/MSS, a transmission opportunity of sending the bandwidth request message, the procedure comprises:
   transmitting, by the RS, a pseudo random ranging code or a contention code of the bandwidth request from the SS/MSS to the corresponding BS;
   allocating, by the BS, a uplink bandwidth of the RS to the SS/MSS for sending the bandwidth request message according to the received pseudo random ranging code or the received contention code, and sending an uplink bandwidth allocation information to the RS, wherein the bandwidth allocation information is adapted to grant the SS/MSS to send the bandwidth request message; and
   forwarding, by the RS, the bandwidth grant information to the corresponding SS/MSS.

8. The method according to claim 7, wherein the bandwidth grant information carries a request information element (Request IE) of broadcast, multicast or unicast; and
   initiating, by the SS/MSS, the bandwidth request via the request information element (Request IE) of broadcast, multicast or unicast carried by the bandwidth grant message.

9. A base station apparatus, in a Bandwidth Wireless Access (BWA) system including a relay station (RS), comprising:
   a first unit adapted to performing bandwidth allocation for the link of the RS, and generating a bandwidth grant information which reflects the corresponding bandwidth allocation after receiving a bandwidth request message from a subscriber station/mobile subscriber station (SS/MSS) relayed by the RS, wherein the bandwidth grant information comprises a UL-MAP$_{RS}$ message which is adapted to bandwidth allocation for the uplink of the RS and a DL-MAP$_{RS}$ message which is adapted to bandwidth allocation for the downlink of the RS, and usage and location of each burst of corresponding connection of the SS/MSS belonging to the RS is indicated in the DL-MAP$_{RS}$ message and the UL-MAP$_{RS}$ message; and
a second unit adapted to sending the bandwidth grant information to the RS.

10. A system for implementing bandwidth allocation base on a relay station (RS), comprising a base station (BS) and a RS, wherein:
the BS is configured to receive a bandwidth request message from a subscriber station/mobile subscriber station (SS/MSS) relayed by the RS, perform bandwidth allocation for the link of the RS, and generate a bandwidth grant information which reflects the corresponding bandwidth allocation; wherein the bandwidth grant information comprises a UL-MAP$_{RS}$ message which is adapted to bandwidth allocation for the uplink of the RS and a DL-MAP$_{RS}$ message which is adapted to bandwidth allocation for the downlink of the RS, and usage and location of each burst of corresponding connection of the SS/MSS belonging to the RS is indicated in the DL-MAP$_{RS}$ message and the UL-MAP$_{RS}$ message; send the bandwidth grant information to the RS;

the RS is configured to perform a relay processing to the UL-MAP$_{RS}$ message and the DL-MAP$_{RS}$ message and transmit the UL-MAP$_{RS}$ message and the DL-MAP$_{RS}$ message to the SS/MSS or a subordinate RS.

11. A method for implementing bandwidth allocation based on a relay station (RS), in a Bandwidth Wireless Access (BWA) system, comprising:
receiving, by a base station (BS) a bandwidth request message from a subscriber station/mobile subscriber station (SS/MSS) relayed by the RS;
performing, by the BS, bandwidth allocation for the link of the RS, and generating a bandwidth grant information which reflects the corresponding bandwidth allocation, wherein the bandwidth grant information comprises a UL-MAP$_{RS}$ message which is adapted to bandwidth allocation for the uplink of the RS and a DL-MAP$_{RS}$ message which is adapted to bandwidth allocation for the downlink of the RS, and usage and location of each burst of corresponding connection of the SS/MSS belonging to the RS is indicated in the DL-MAP$_{RS}$ message and the UL-MAP$_{RS}$ message;
sending, by the BS, the bandwidth grant information to the RS.

* * * * *